US008610919B2

(12) United States Patent
Kaneda

(10) Patent No.: US 8,610,919 B2
(45) Date of Patent: Dec. 17, 2013

(54) IMAGE FORMING APPARATUS, CONTROL METHOD AND CONTROL PROGRAM THEREFOR

(75) Inventor: Takeshi Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 516 days.

(21) Appl. No.: 12/420,738

(22) Filed: Apr. 8, 2009

(65) Prior Publication Data
US 2009/0284783 A1 Nov. 19, 2009

(30) Foreign Application Priority Data

May 14, 2008 (JP) ................................. 2008-127375

(51) Int. Cl.
*G06F 3/12* (2006.01)

(52) U.S. Cl.
USPC ........... 358/1.15; 358/1.6; 358/1.9; 358/1.13; 358/1.18

(58) Field of Classification Search
None
See application file for complete search history.

(56) References Cited

U.S. PATENT DOCUMENTS

| | | | | |
|---|---|---|---|---|
| 6,700,678 | B1 * | 3/2004 | Luman | 358/1.15 |
| 7,085,763 | B2 | 8/2006 | Ochiai et al. | |
| 7,180,619 | B2 * | 2/2007 | Ferlitsch | 358/1.15 |
| 7,426,046 | B2 | 9/2008 | Shirai et al. | |
| 2004/0125402 | A1 * | 7/2004 | Kanai et al. | 358/1.15 |
| 2005/0128503 | A1 | 6/2005 | Matsushita | |
| 2006/0050294 | A1 * | 3/2006 | Smith et al. | 358/1.15 |
| 2006/0232811 | A1 * | 10/2006 | Yokoyama | 358/1.14 |
| 2008/0106762 | A1 * | 5/2008 | Mullender et al. | 358/1.16 |

FOREIGN PATENT DOCUMENTS

| | | |
|---|---|---|
| JP | 2000-312222 A | 11/2000 |
| JP | 2000-339126 A | 12/2000 |
| JP | 2001-337875 A | 12/2001 |
| JP | 2002-312266 A | 10/2002 |
| JP | 2003-029949 A | 1/2003 |
| JP | 2003-036155 A | 2/2003 |
| JP | 2003-050685 A | 2/2003 |
| JP | 2003-091394 A | 3/2003 |
| JP | 2005-174219 A | 6/2005 |
| JP | 2005165773 A | 6/2005 |
| JP | 2006-155465 A | 6/2006 |
| JP | 2006-187925 A | 7/2006 |
| JP | 2006-222508 A | 8/2006 |
| JP | 2006-243998 A | 9/2006 |
| JP | 2006-321185 A | 11/2006 |

OTHER PUBLICATIONS

Japanese Office Action dated Oct. 1, 2012 in corresponding Japanese Application No. 2008-127375.

* cited by examiner

*Primary Examiner* — Miya J Cato
(74) *Attorney, Agent, or Firm* — Fitzpatrick, Cella, Harper & Scinto

(57) ABSTRACT

There is provided an image forming apparatus that is connected to a plurality of other image forming apparatuses via a network, including a function presenting unit that presents required functions of a job to be transferred from the image forming apparatus a transfer destination candidate presenting unit that retrieves, from among the a plurality of other image forming apparatuses, an image forming apparatus that supports the required functions of the transferred job by comparing the required functions of the transferred job and a function supported by the other image forming apparatuses, and presents the retrieved apparatus and a transfer destination candidate re-presenting unit that presents another image forming apparatus that supports the remaining required functions when one or more of the required functions of the transferred job are de-selected.

9 Claims, 15 Drawing Sheets

FIG. 2A

| ITEM OF PRINT ATTRIBUTE | | | 101' | 101" | 102 | 103 | 104 | 105 | 106 | 107 |
|---|---|---|---|---|---|---|---|---|---|---|
| TRANSFER ATTRIBUTE | SSL TRANSMISSION | | ○ | ○ | ○ | ○ | ○ | ○ | ○ | ○ |
| | SECURE JOB | | ○ | ○ | | | | | ○ | ○ |
| FORMAT | LIPS | | | | | | | | | |
| | PDF | | ○ | ○ | ○ | ○ | ○ | ○ | ○ | ○ |
| | PS | | | | | | | | | |
| PRINT ATTRIBUTE | PAPER SIZE | A3 | ○ | ○ | ○ | ○ | ○ | ○ | ○ | ○ |
| | | A4 | | | | | | | | |
| | | OHP | | | ○ | ○ | ○ | ○ | ○ | ○ |
| | | POST CARD | | | ○ | | | | | |
| | COLOR PRINTING | | ○ | × | ○ | ○ | ○ | ○ | ○ | ○ |
| | MONOCHROME PRINTING | | ○ | ○ | ○ | ○ | ○ | ○ | ○ | ○ |
| | DOUBLE-SIDED PRINTING | | | | | ○ | ○ | ○ | ○ | ○ |
| | DOCUMENT SECURITY | WATERMARK PRINTING | ○ | × | | | ○ | ○ | ○ | ○ |
| | | COPY GUARD | ○ | × | | | | ○ | ○ | ○ |
| | PUNCHING | 2 HOLES | | | | | ○ | ○ | ○ | ○ |
| | | 4 HOLES | | | | | ○ | ○ | ○ | ○ |
| Finishing | SORTING | LATERAL SHIFTING | ○ | ○ | | | | | ○ | ○ |
| | | 90-DEGREE ROTATION | | | | | | | ○ | ○ |
| | STAPLE | | | | | | | | ○ | ○ |
| | BOOKBINDING PRINTING | | | | | | | | | ○ |

ITEMS WITH A "○" REPRESENT PRINT ATTRIBUTES SUPPORTED BY AN IMAGE FORMING APPARATUS

| ITEM OF PRINT ATTRIBUTE | | 101 | Alternative Code | | | | | | |
|---|---|---|---|---|---|---|---|---|---|
| | | | 102 | 103 | 104 | 105 | 106 | 107 | |
| TRANSFER ATTRIBUTE | SSL TRANSMISSION | 1001 | 1001 | 1001 | 1001 | 1001 | 1001 | |
| | SECURE JOB | 1002 | - | - | 1002 | 1002 | 1002 | |
| FORMAT | LIPS | 1110 | 1110 | 1110 | 1110 | 1110 | 1110 | |
| | PDF | 1111 | 1111 | | 1111 | 1111 | 1111 | |
| | PS | | | | | 1112 | 1112 | |
| PRINT ATTRIBUTE | PAPER SIZE | A3 | 1210 | 1210 | 1210 | 1210 | 1210 | 1210 |
| | | A4 | 1210 | 1210 | 1210 | 1210 | 1210 | 1210 |
| | | OHP | | 1250 | 1250 | 1250 | | |
| | | POST CARD | 1260 | 1260 | 1260 | 1260 | 1260 | |
| | COLOR PRINTING | 1270 | 1270 | 1270 | 1270 | 1270 | 1270 | |
| | MONOCHROME PRINTING | | 1270 | 1270 | 1270 | 1270 | 1270 | |
| | DOUBLE-SIDED PRINTING | 1285 | 1285 | 1285 | 1285 | 1285 | | |
| | WATERMARK PRINTING | | 1290 | 1290 | 1290 | 1290 | | |
| | DOCUMENT SECURITY | COPY GUARD | 1290 | | | 1290 | | |
| | PUNCHING | 2 HOLES | 1310 | | | | 1310 | |
| | | 4 HOLES | | | | | | |
| Finishing | SORTING | LATERAL SHIFTING | | | 1390 | 1390 | 1390 | 1390 |
| | | 90-DEGREE ROTATION | | | 1390 | 1390 | 1390 | 1390 |
| | STAPLE | 1390 | | | 1390 | 1390 | 1390 | 1390 |
| | BOOKBINDING PRINTING | | | | 1400 | | | |

SAME Alternative Code INDICATES ALTERNATIVE ATTRIBUTE

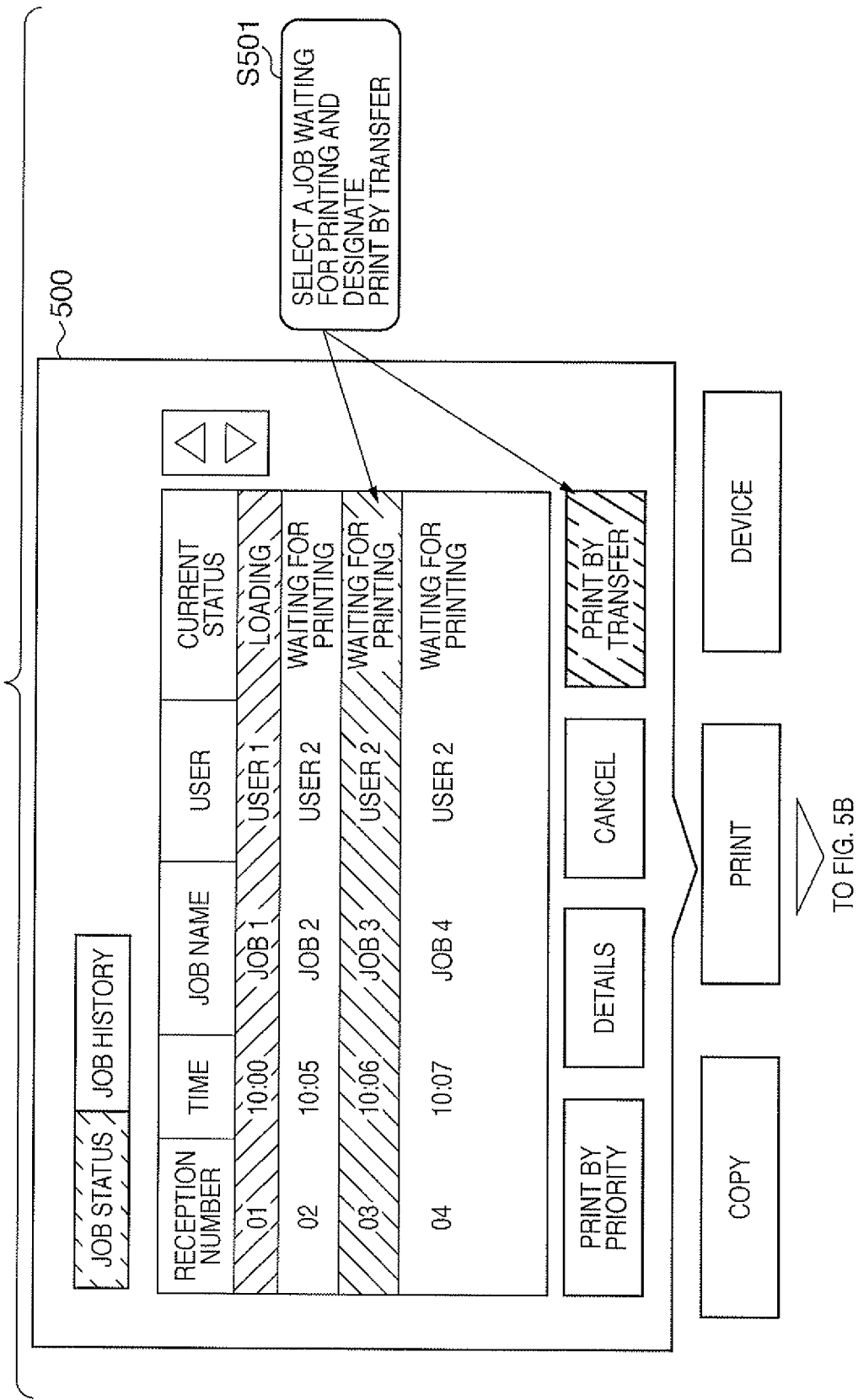

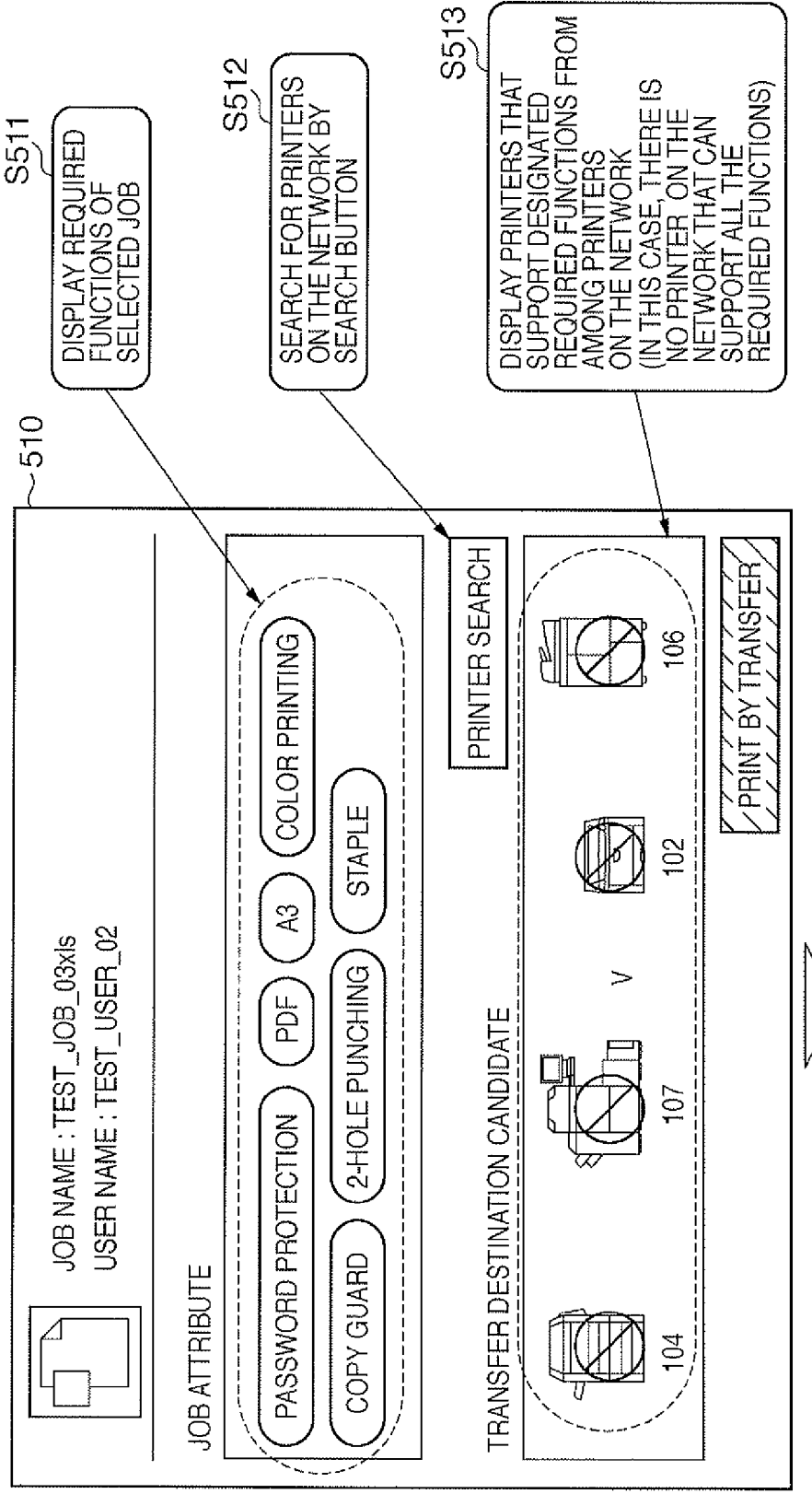

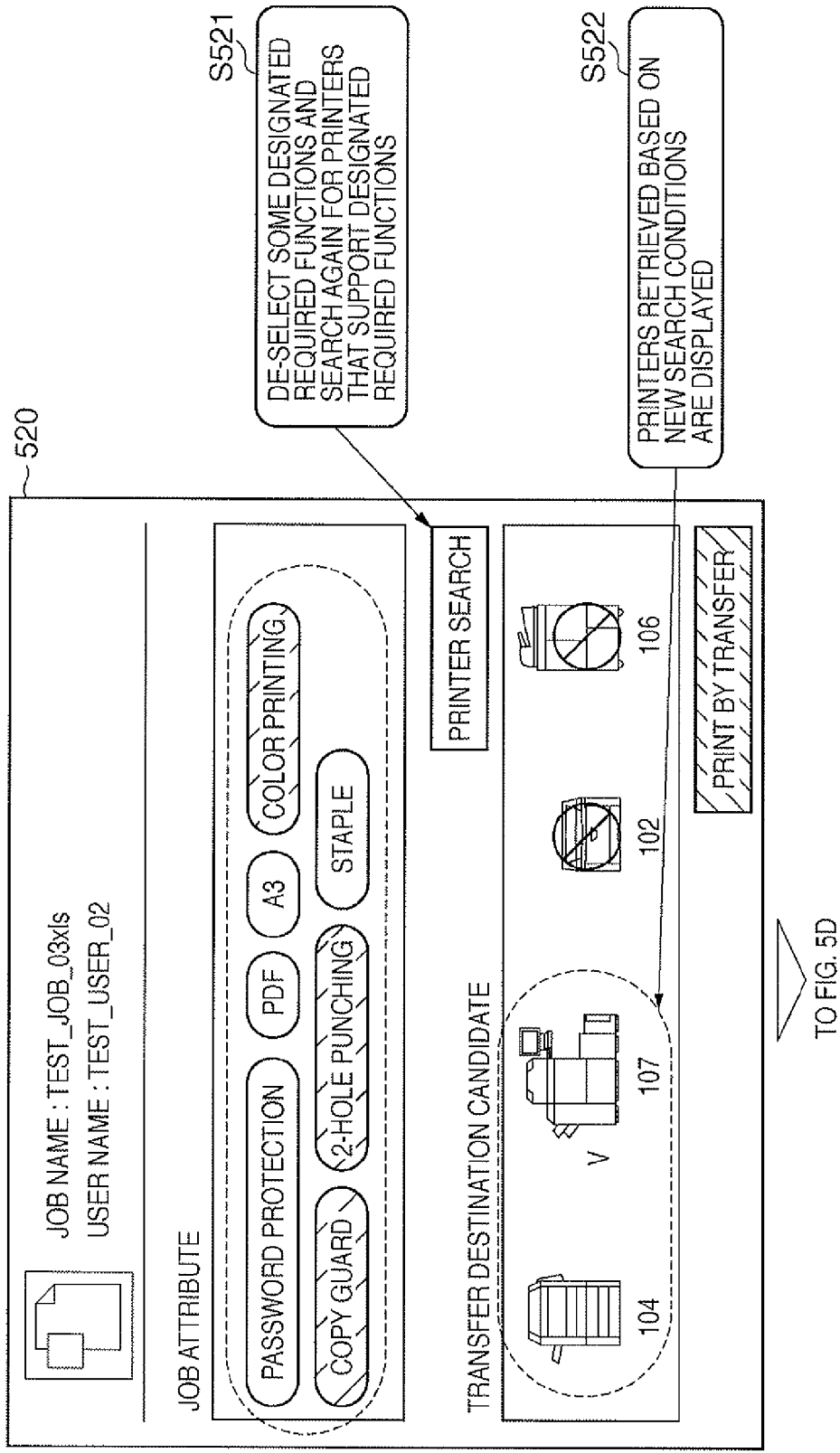

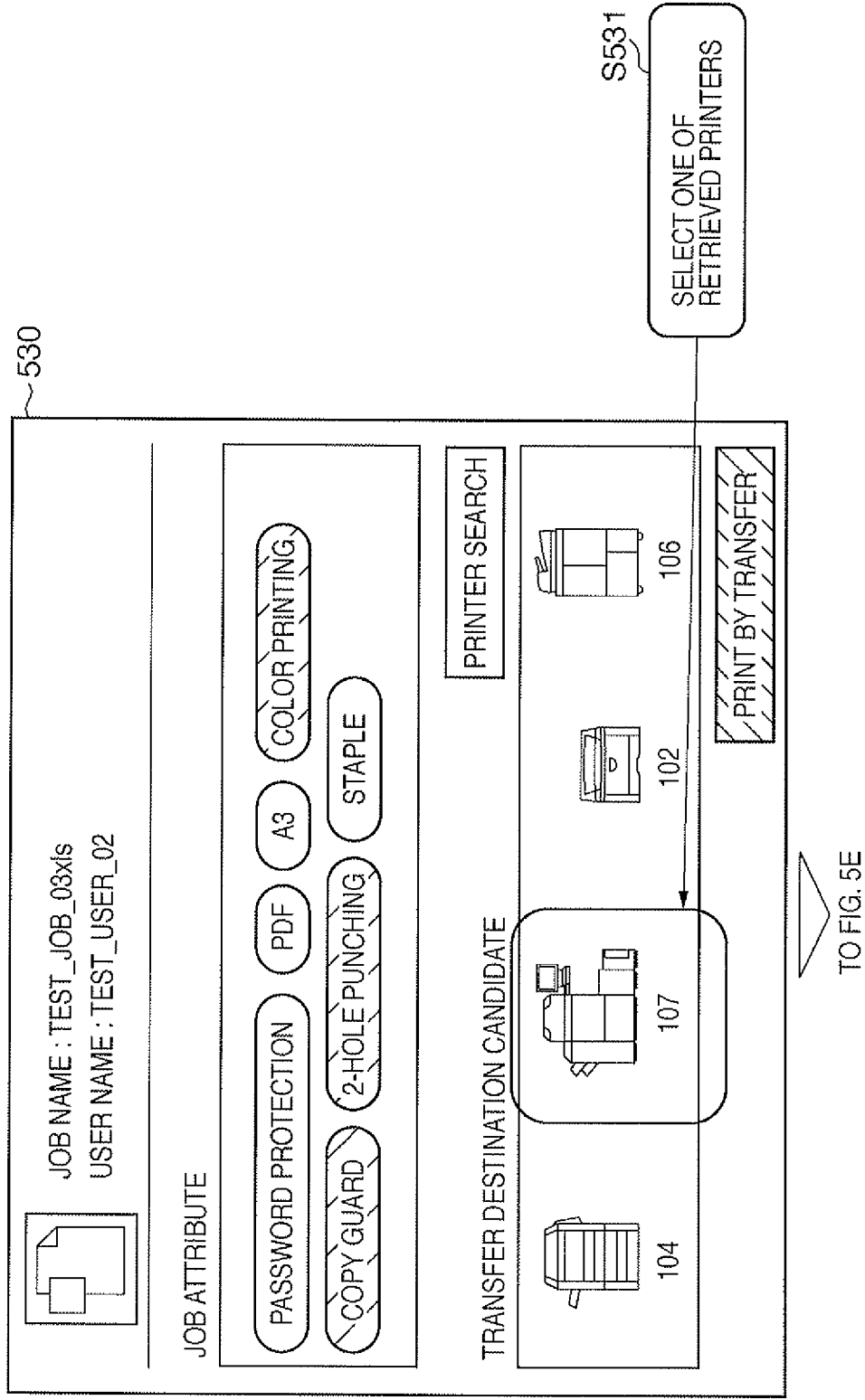

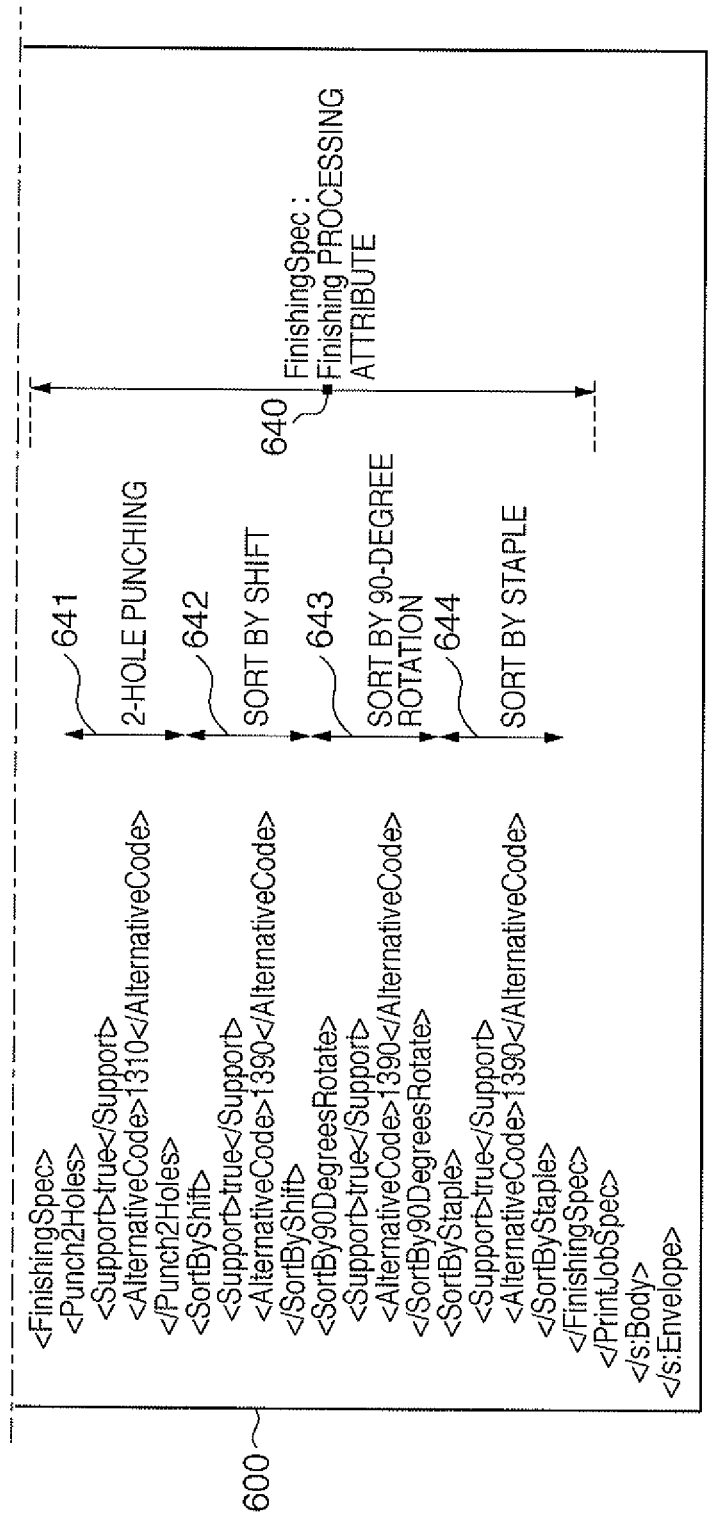

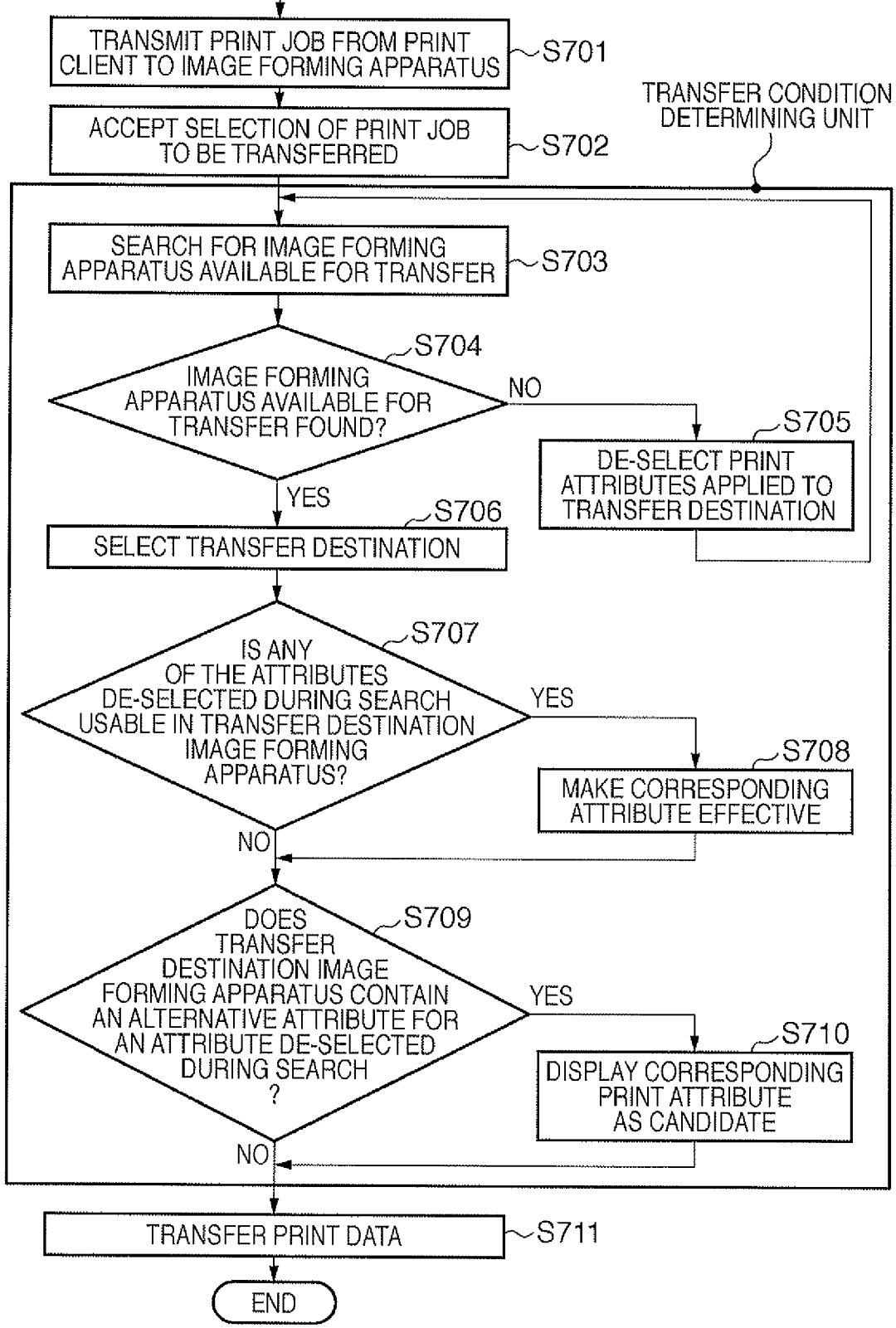

IMAGE FORMING APPARATUS, CONTROL METHOD AND CONTROL PROGRAM THEREFOR

BACKGROUND OF THE INVENTION

1. Field of the Invention

The present invention relates to a technique for transferring a job from an image forming apparatus to another image forming apparatus.

2. Description of the Related Art

After an information processing apparatus as a print client has transmitted print data to an image forming apparatus, there are cases in which it is desired to transfer that transmitted print data to a different image forming apparatus for some reason. An example of a document regarding such printing by transfer includes Japanese Patent Laid-Open No. 2005-165773.

In this document, after a user has carried out a process for transmitting the print data from an information processing apparatus to a first image forming apparatus, the user selects a corresponding job from a spooler of the first image forming apparatus and drags that job onto the icon of a second image forming apparatus.

Utility software of the information processing apparatus compares the attribute information of the print job and the attribute information of the second image forming apparatus, so as to determine whether the job dragged by the user can be output with the second image forming apparatus. In the case where the job cannot be printed at the drag destination, the second image forming apparatus, the icon thereof is put into a grey-out state so as to notify the user of the fact that the second image forming apparatus is unusable. In this manner, the user can easily retrieve an alternative image forming apparatus that can perform printing.

In the re-transfer as described above, in the case where no image forming apparatus is present on the same network that has at least equivalent functions to those of the first image forming apparatus, the user cannot utilize such printing by transfer.

SUMMARY OF THE INVENTION

The present invention improves user operability when transferring a job from an image forming apparatus to another image forming apparatus.

According to one aspect of the present invention, there is provided an image forming apparatus that is connected to a plurality of other image forming apparatuses via a network, and is capable of transferring a job that has been input to any of the other image forming apparatuses, comprising: an input unit configured to receive as input a job containing required functions for processing the job; a function presenting unit configured to present the required functions contained in the job input at the input unit; a transfer destination candidate presenting unit configured to retrieve, from among the plurality of other image forming apparatuses, an image forming apparatus that supports the required functions of the job input at the input unit, based on the required functions presented by the function presenting unit and a function supported by the other image forming apparatuses, and present the retrieved image forming apparatus as a transfer destination candidate for the job input at the input unit; and a transfer destination candidate re-presenting unit configured to re-present another image forming apparatus that supports the remaining required functions when one or more of the required functions of the job input at the input unit are de-selected, as a transfer destination candidate for the job input at the input unit.

According to another aspect of the present invention, there is provided a method for controlling an image forming apparatus that is connected to a plurality of other image forming apparatuses via a network, and is capable of transferring a job that has been input to any of the other image forming apparatuses, the method comprising: receiving as input a job containing required functions for processing the job; presenting the required functions contained in the job received as input; retrieving, from among the plurality of other image forming apparatuses, an image forming apparatus that supports the required functions of the job received as input, based on the required functions presented in the presenting and a function supported by the other image forming apparatuses, and presenting the retrieved image forming apparatus as a transfer destination candidate for the job received as input; and re-presenting another image forming apparatus that supports the remaining required functions when one or more of the required functions of the job received as input are de-selected as a transfer destination candidate for the job received as input.

According to still another aspect of the present invention, there is provided a computer-readable storage medium storing a computer program for causing a computer to execute a method for controlling an image forming apparatus that is connected to a plurality of other image forming apparatuses via a network, and is capable of transferring a job that has been input to any of the other image forming apparatuses, the method comprising: receiving as input a job containing required functions for processing the job; presenting the required functions contained in the job received as input; retrieving, from among the plurality of other image forming apparatuses, an image forming apparatus that supports the required functions of the job received as input, based on the required functions presented in the presenting and a function supported by the other image forming apparatuses, and presenting the retrieved image forming apparatus as a transfer destination candidate for the job received as input; and re-presenting another image forming apparatus that supports the remaining required functions when one or more of the required functions of the job received as input are de-selected as a transfer destination candidate for the job received as input.

Further features of the present invention will be apparent from the following description of exemplary embodiments with reference to the attached drawings.

BRIEF DESCRIPTION OF THE DRAWINGS

FIGS. 2A and 2B are diagrams illustrating tables for managing print attributes.

FIG. 7 is a flowchart illustrating a transfer condition determination process.

DESCRIPTION OF THE EMBODIMENTS

An embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1A:
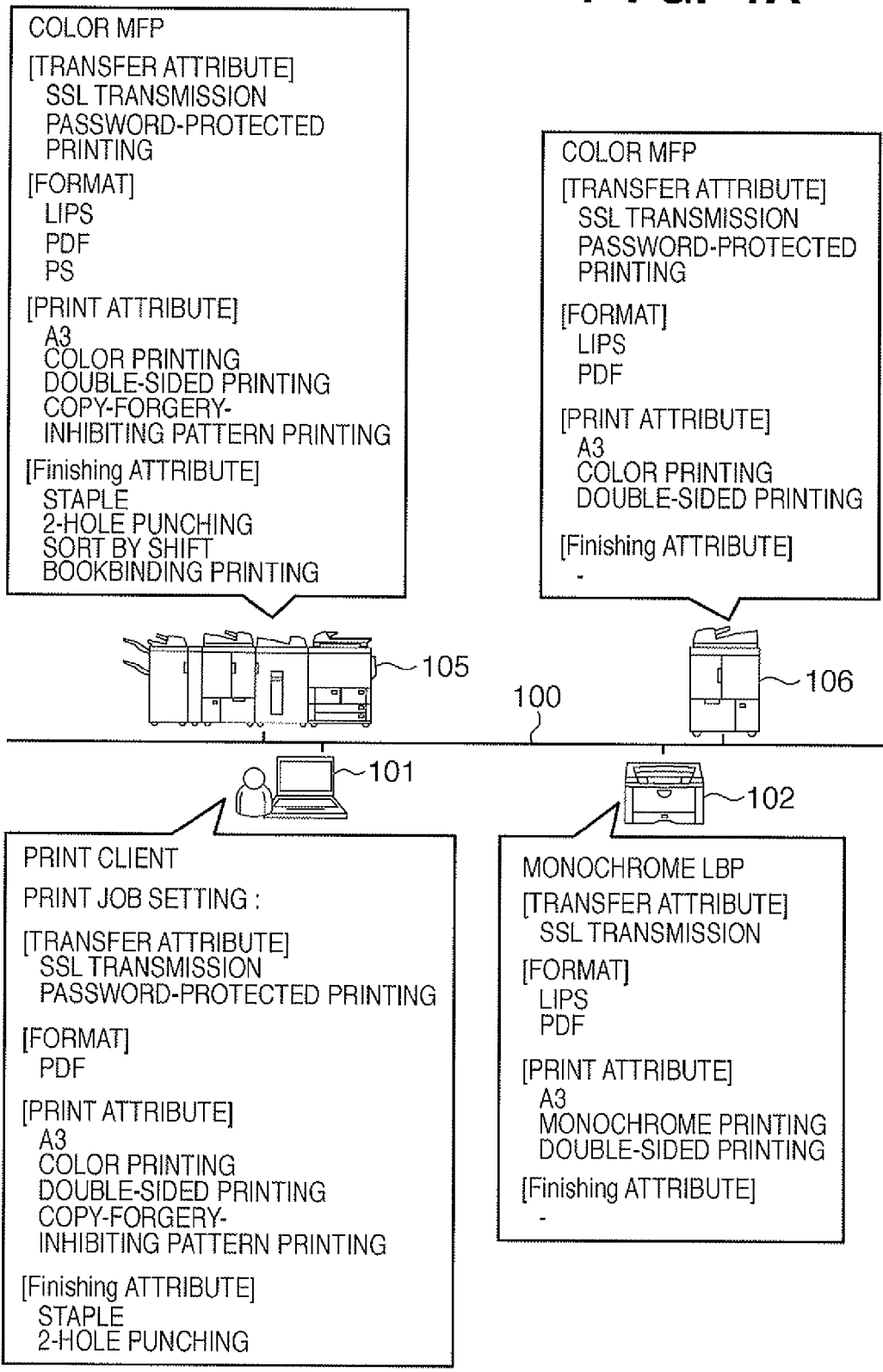
FIG. 1 is a configuration diagram of a network including an image forming apparatus.
Figure 1B:
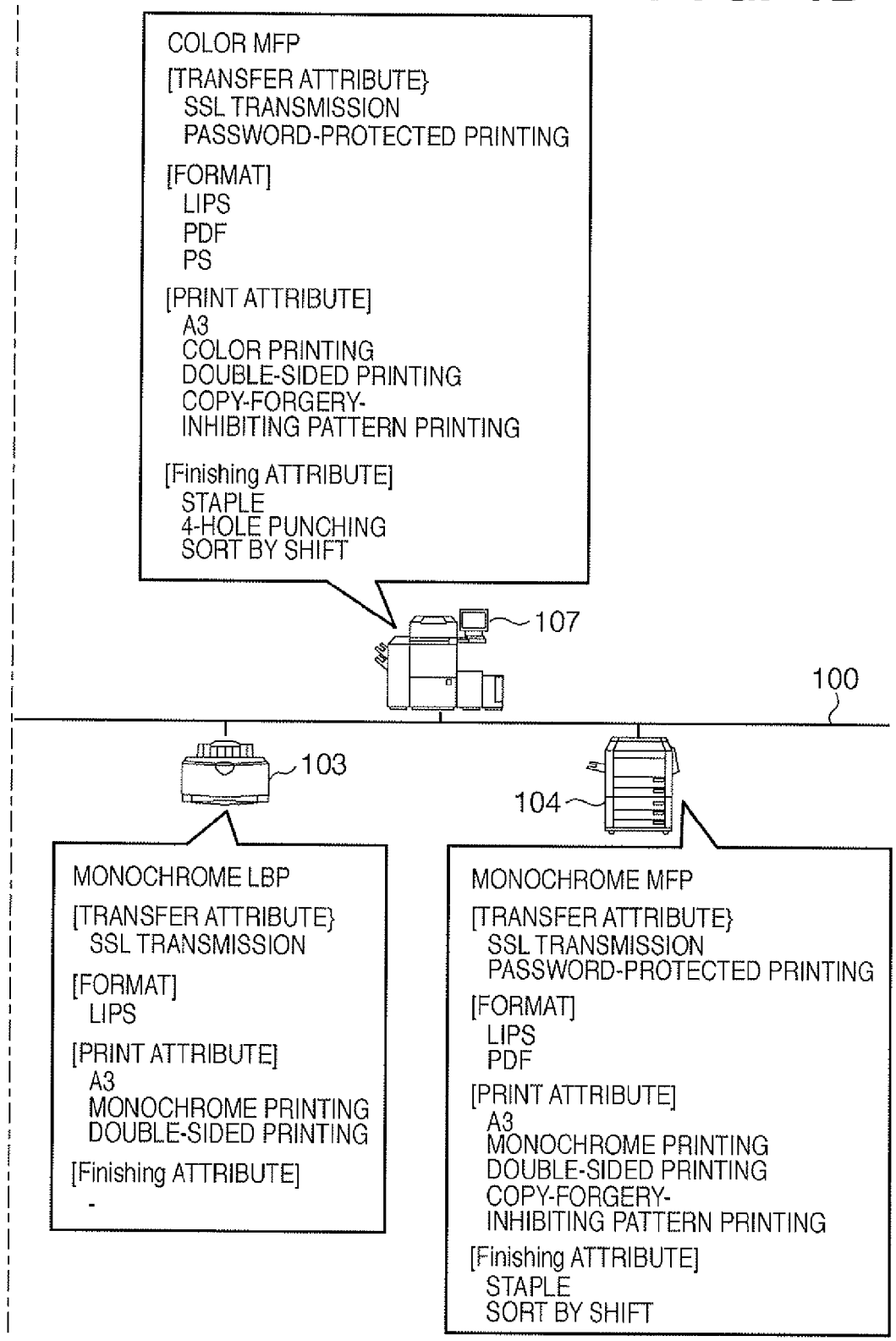

FIG. 1 is a configuration diagram of a network including an image forming apparatus as an embodiment of the present invention. In FIG. 1, as an example, a print client 101 as an information processing apparatus, and six image forming apparatuses having different process capacities, that is, image forming apparatuses 102 to 107, are connected to a network 100. A printer driver compatible with the image forming apparatus 105 is installed on the print client 101. The print settings of each apparatus are shown in balloons. When the print client 101 generates print data and transfers the print data to the image forming apparatus 105, the image forming apparatus 105 analyzes the print data to perform print processing. In the case where it is impossible for some reason to continue print processing, the print job is transferred to another image forming apparatus.

In the present embodiment, the print client 101 first transmits a job to the image forming apparatus 105, and thereafter the transmitted job is selected on an user interface (UI) screen of the image forming image forming apparatus 105, a list of retrieved transfer destinations is generated, and the image forming apparatus 107 is selected from the retrieval list as a transfer destination. Finally, print attributes (required functions set for the job) are reset so as to comply with the image forming apparatus 107, and transfer processing is performed.

Figure 3:
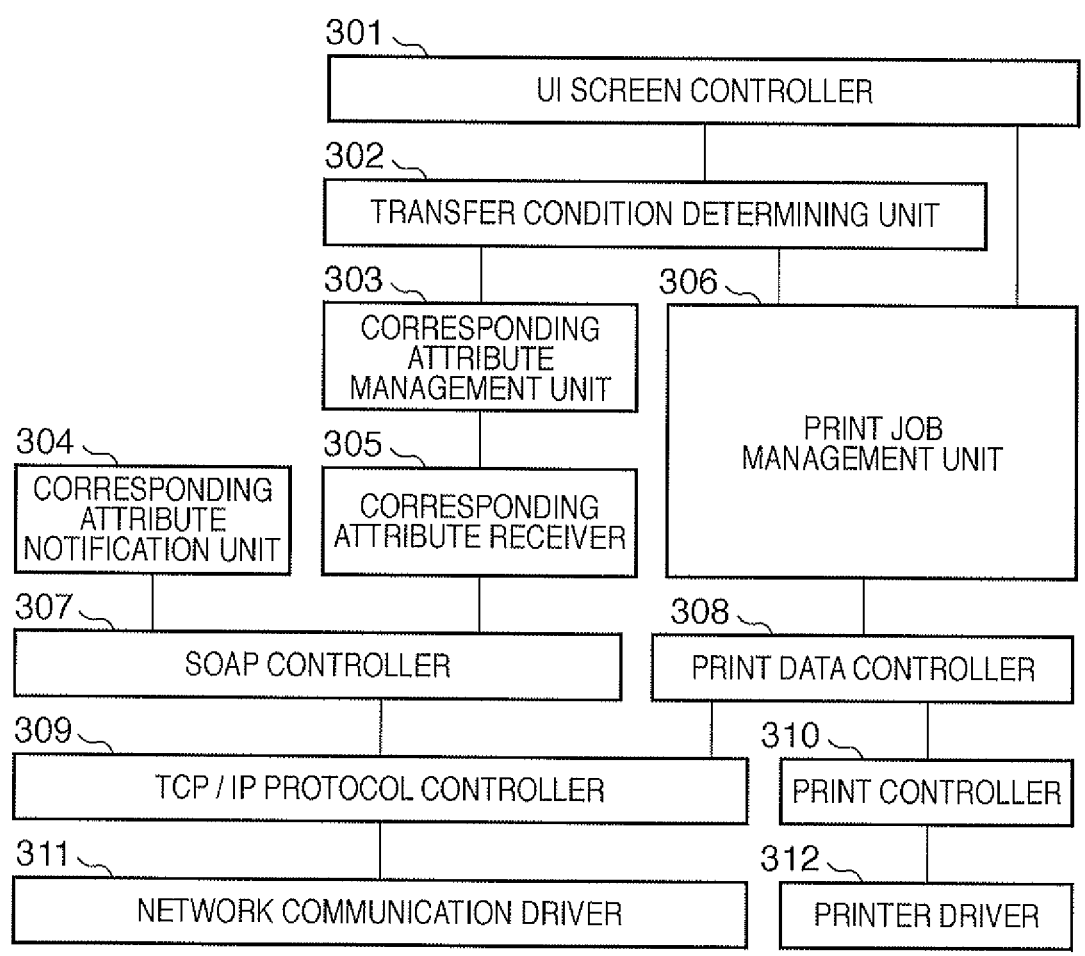
FIG. 3 is a diagram showing a software configuration of an image forming apparatus.

FIG. 2 illustrates management tables 200 and 210 for managing print attributes supported by the image forming apparatus illustrated in FIG. 1 (functions provided in the image forming apparatus). FIG. 3 is a diagram showing a software configuration of each of the image forming apparatuses 102 to 107.

A user interface (UI) screen controller 301 renders UI screens on an operation panel of a touch screen type, and in cooperation with a transfer condition determining unit 302, accepts searches for an image forming apparatus as a transfer destination as well as operations for the selection/modification of the print attributes of a job to be transferred. When the user has selected an alternative print attribute, the UI screen controller 301 notifies a print job management unit 306 of the details of the modification.

The transfer condition determining unit 302 compares the management table 200 that is shown in FIG. 2 and held by a corresponding attribute management unit 303 with the attribute information of the selected job, and determines whether it is possible to transfer the job to the image forming apparatus selected by the user. If it is possible to transfer the job as-is, the transfer condition determining unit 302 instructs the print job management unit 306 to transfer the job. When no transfer destination is found, the transfer condition determining unit 302 notifies the UI screen controller 301 of the print attributes that the currently-selected image forming apparatus cannot support. At the same time, the transfer condition determining unit 302 searches a conversion table of alternative attributes, and notifies the UI screen controller 301 of a list of alternative attributes.

The corresponding attribute management unit 303 holds corresponding attribute information on other image forming apparatuses received by a corresponding attribute receiver 305 in the form of the management table 200 shown in FIG. 2A and the management table 210 shown in FIG. 2B for searching for alternative attributes among the image forming apparatuses, and uses the tables as references for the transfer condition determining unit 302. These management tables 200 and 210, upon receiving a multicast message 600 (FIG. 6) from the network, are constantly updated to reflect the latest information through operations by the corresponding attribute management unit 303 and corresponding attribute receiver 305.

In FIG. 2A, a column 101' in the management table 200 indicates the attributes (required functions) of a print job to be transferred. Required functions include, as shown in FIG. 1A, a data transmission system or authentication method such as SSL communication or Secure Print, formats such as LIPS, PDF or PS, paper size, color/monochrome, double-sided/single-sided, watermarks, and copy guard, etc. In addition, a job contains information on whether the job requires finishing such as 2-hole/4-hole punching, sorting (with/without staple) or bookbinding, and this information is managed in the table shown in FIG. 2A. A "○" (circle) in the table indicates that the corresponding attribute is used in a job transferred from the print client. Columns 102 to 107 indicate print attributes supported by the image forming apparatuses 102 to 107, and the information therein is updated by multicast communication from each of the image forming apparatuses. Items with a "○" represent print attributes supported by the corresponding image forming apparatus. Determination as to whether a certain job can be transferred to a specific image forming apparatus is made by comparing the column 101' with the columns 102 to 107 of the image forming apparatuses, and transfer processing to the image forming apparatus with a "○" for all the attributes that have a "○" in the column 101' is performed. Herein, only the image forming apparatus 105 satisfies this condition, and other image forming apparatuses have a functional configuration that cannot support at least one of the print attributes contained in the job 101'. Therefore, those other image forming apparatuses cannot perform printing even if the job 101' is transferred thereto, unless that unsupported attribute is cancelled from the job 101'.

A column 101" indicates a settings example when a user has reset the print attributes of the transferred job through the UI operation screen in the present embodiment. In this example, three requirements, that is, color printing, copy guard, and 2-hole punching, are cancelled to mitigate the functional conditions required of the image forming apparatus. As a result, the image forming apparatus 107, in addition to the image forming apparatus 105, is able to perform printing.

The management table 210 in FIG. 2B shows, in an organized manner, into which alternative attribute group the respective print attributes supported by the image forming apparatuses are classified. The values in the table represent codes defined by the <AlternativeCode> tag in the multicast message 600. It is indicated that print attributes having a common code can be used as alternative functions. For example, the image forming apparatus 105 supports the 2-hole punch attribute, while the image forming apparatus 107 supports the 4-hole punch attribute. Both have an <AlternativeCode> of 1310. The transfer condition determining unit 302 refers to the management table 210 of the corresponding attribute management unit 303, and compares the functions of the transfer source and the transfer destination. When an attribute that completely matches that designated at the transfer source is not found, an alternative attribute, which is another attribute that has the same <AlternativeCode> as that of the transfer source, is sought. In the case where an alternative attribute is found, the user is notified of the alternative attribute through the UI screen controller 301, and determines whether or not to use the alternative attribute.

Figure 6A:
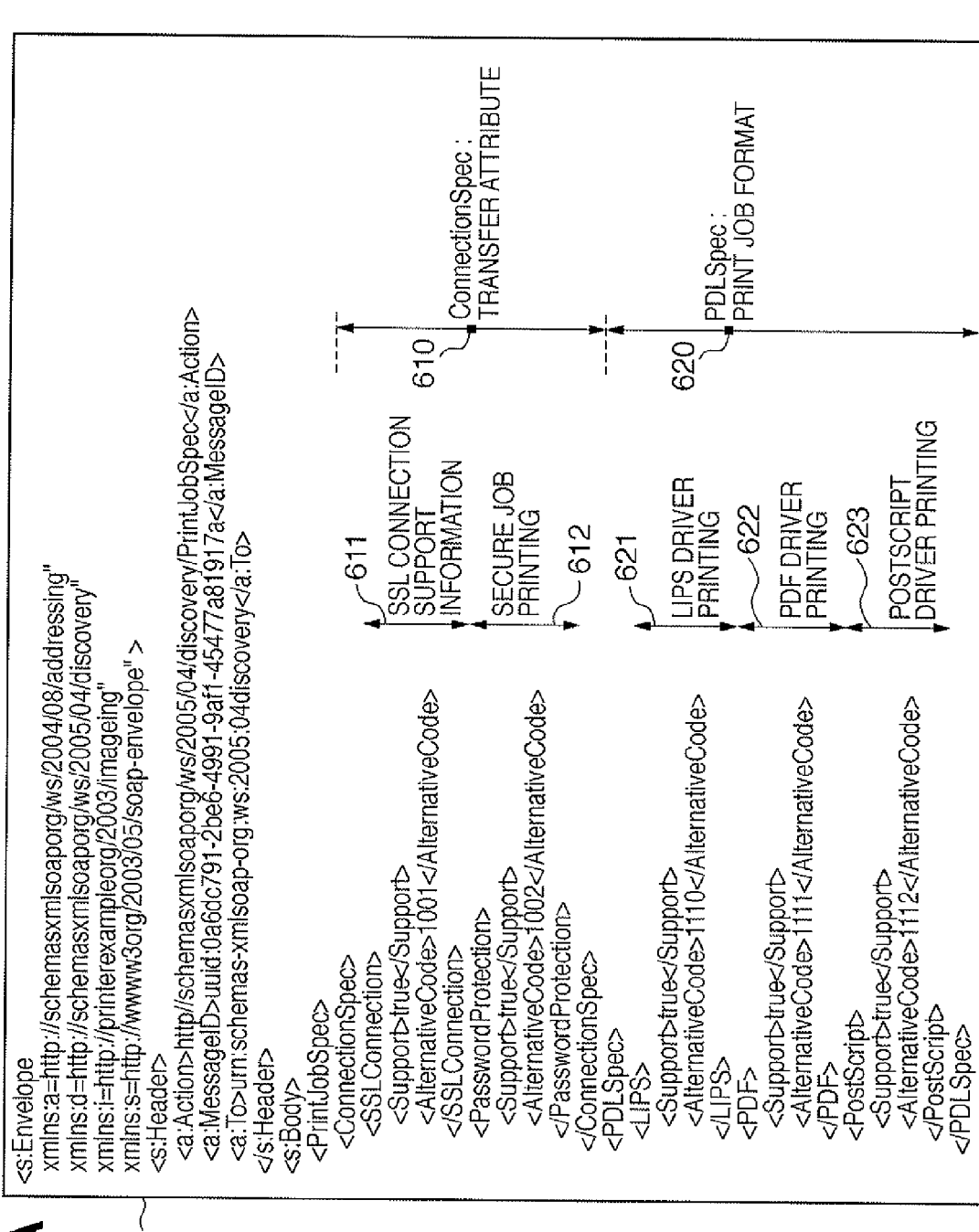
FIG. 6 is a diagram showing an exemplary multicast SOAP message communicating functions supported by an image forming apparatus.
Figure 6B:
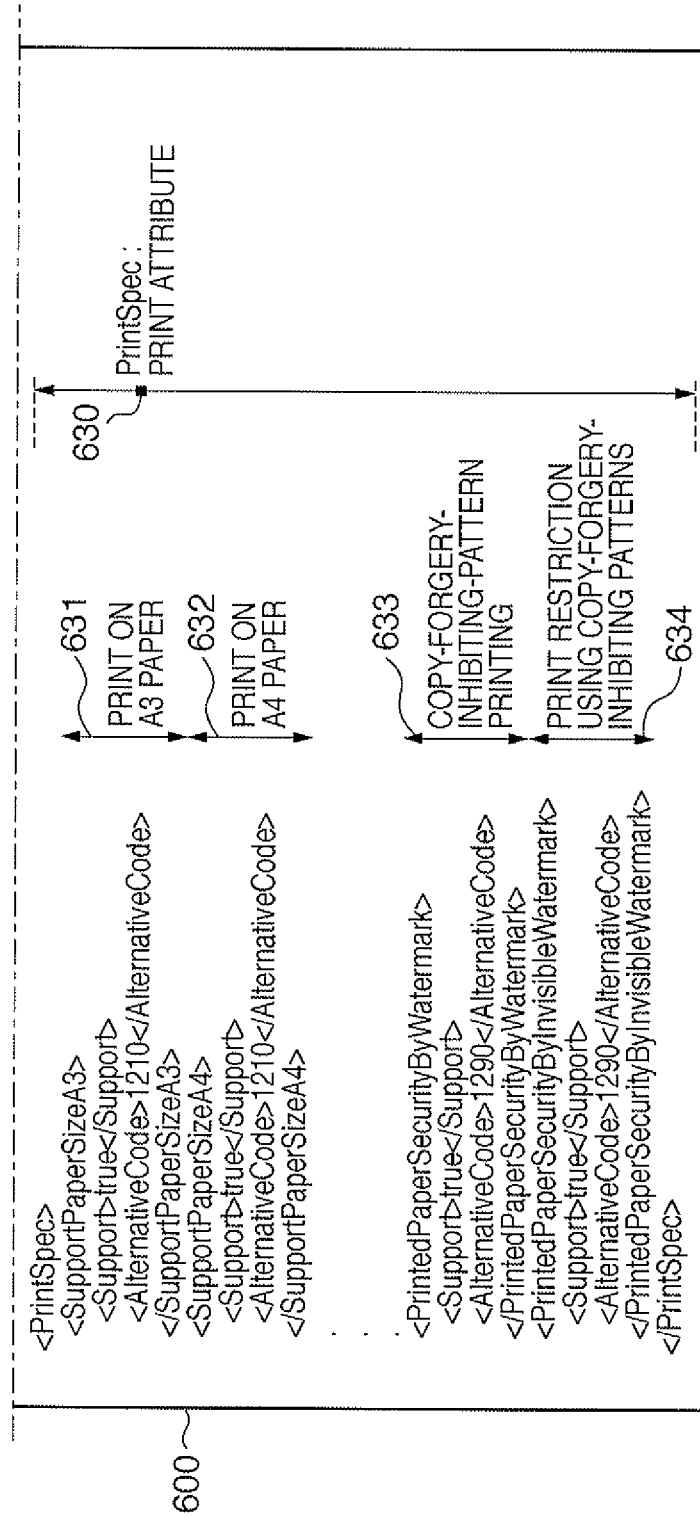

A corresponding attribute notification unit 304 converts its own corresponding attribute information to the multicast message 600 in SOAP format shown in FIG. 6 through a SOAP controller 307, and communicates the multicast message 600 to the image forming apparatuses on the same network.

The corresponding attribute receiver 305 acquires corresponding attribute information in SOAP message format that has been communicated from other image forming apparatuses on the same network. The analysis/acquisition process of such SOAP messages is carried out in cooperation with the SOAP controller 307. Details of the acquired information are communicated to the corresponding attribute management unit 303.

The print job management unit 306 receives the print data transferred from the print client in cooperation with a TCP/IP protocol controller 309 and print data controller 308, and spools the print data in an internal buffer. The UI screen controller 301 is notified of jobs for which spooling has been completed in the form of list data. Next, print jobs accumulated in the internal buffer are forwarded to a print controller 310 in accumulated order. The print controller 310 operates the printer engine via a printer driver 312 to perform print processing. When the user selects a job stored in the internal buffer using the UI screen and gives an instruction to transfer the job, the print job management unit 306 carries out transfer processing of the print job to another apparatus via the print data controller 308 and the TCP/IP protocol controller 309. In addition, when the user has given instructions to modify the attribute information of the print job through the UI screen controller 301, the print job management unit 306 rewrites the attribute information of the job, and carries out the transfer processing thereof.

Figure 4:
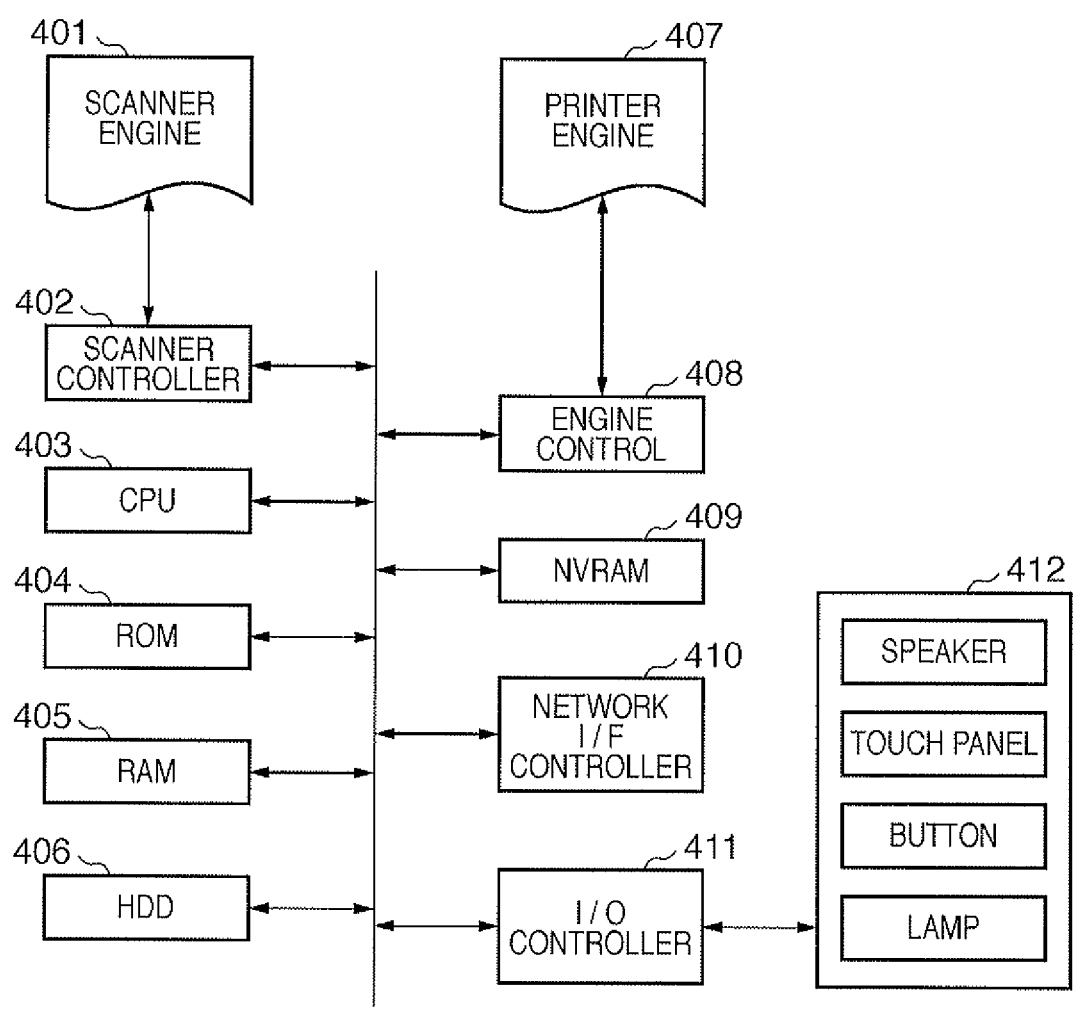
FIG. 4 is a diagram showing a hardware configuration of an image forming apparatus.

The hardware configuration of the image forming apparatus is described with reference to FIG. 4. FIG. 4 is a diagram showing the hardware configuration common to the image forming apparatuses 102 to 107. The image forming apparatuses 102 and 103, which do not include a scanner and are provided with only a print function, do not include a scanner engine 401 and a scanner engine controller 402. The touch panel of the image forming apparatuses 102 and 103 is a display-dedicated compact liquid crystal screen that does not include an input function.

Numeral 402 indicates a scanner engine controller that controls the scanner engine 401, numeral 403 indicates CPU, numeral 404 indicates a ROM that stores a boot program, numeral 405 indicates a RAM memory, and numeral 409 indicates a non-volatile RAM (NVRAM) for storing values set through a panel. Numeral 408 indicates an engine controller that controls a printer engine 407, numeral 406 indicates an HDD, and numeral 411 indicates an I/O controller that controls user interfaces 412 such as a speaker, a touch panel, buttons and lamps. Also, numeral 410 indicates a network I/F controller. All of the above components are connected to a bus 400.

Programs for controlling devices are stored in the HDD 406. When the power is turned on, the CPU 403 reads out a boot program from the ROM 404, and boots the devices as controlled by the boot program. The CPU 403 loads the device control program from the HDD 406 onto the RAM 405 in accordance with the boot program, and reads out the device control program loaded onto the RAM 405, thereby controlling the devices.

Figure 5E:
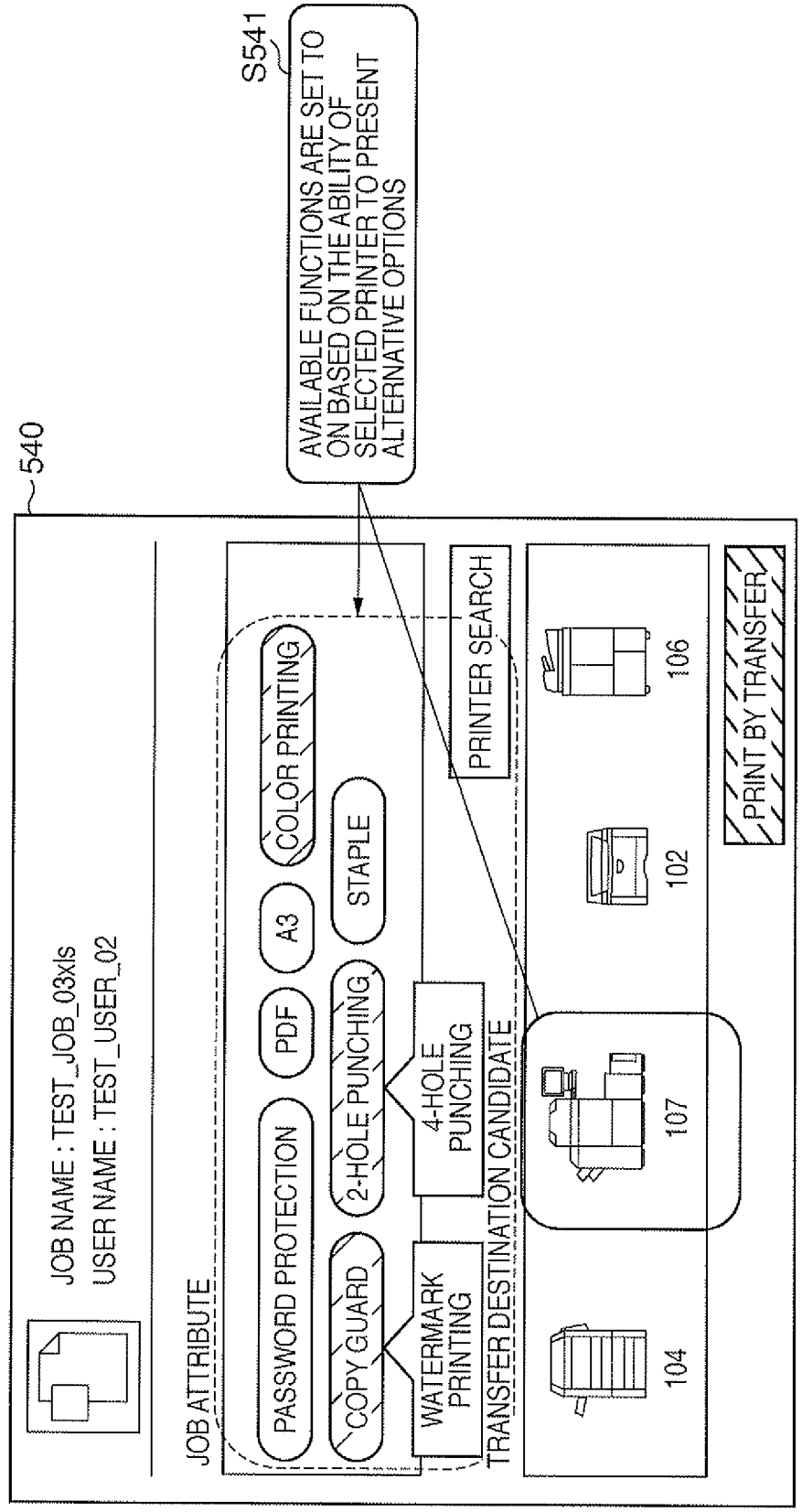
FIG. 5 is a diagram illustrating graphic user interfaces displayed on an image forming apparatus during printing by transfer.

FIG. 5 shows UI screens for printer search and attribute modification for print job transfer processing. FIG. 5 includes screens for five steps, which are shown as UI screen 500, 510, 520, 530 and 540, respectively.

The screen 500 displays a list of print jobs in the spooler that have been transferred from the print client to the image forming apparatus. The user selects from this list a print job to be transferred to another image forming apparatus, and presses a "print by transfer" button (S501). Upon the pressing of the button, the screen changes to the screen 510 for editing attributes of the selected job.

The screen 510 relates to the job that has been selected in step S501. In step S511, the required functions of the job designated by the print client are displayed in a "job attribute" area as of a function presenting unit. When a "printer search" button shown in step S512 is pressed in this state, the search results are displayed in a transfer destination candidate presentation area in step S513. Here, it is indicated that with the print attributes designated in step S511, there is no image forming apparatus that can be designated as a transfer destination printer. Accordingly, in step S521, the user cancels three requirements, "color printing", "copy guard" and "2-hole punching" of the print attributes (required functions) designated by the print client, and then presses the "printer search" button again. The user designates the print attributes to be cancelled and those to be maintained. The search results based on the required functions after the above cancellation are displayed in the transfer destination candidate re-presentation area (S522). In this example, two image forming apparatuses 104 and 107 become selectable as transfer destinations.

It should be noted that in the above case, the user has chosen which required functions are to be de-selected from among a plurality of required functions. However, the present invention is not limited to this. For example, when a cursor is placed on an image forming apparatus displayed in the transfer destination candidate presentation area, the required functions that are supported by that image forming apparatus may be displayed. In this case, the user may place the cursor on each image forming apparatus, and select an image forming apparatus that supports all the required functions that the user considers to be at least necessary. In this case, it is not necessary to choose to de-select any required functions.

Next, in step S531 of the screen 530, the user selects the image forming apparatus 107 (user may select an image forming apparatus arbitrarily). Based on the result of selection in step S531, the transfer condition determining unit 302 compares the print attribute information supported by the image forming apparatus 107 and the attribute information of the print job input by the print client 101. If there is any print attribute that has been cancelled by the user in step S521 but can be supported as a result of the comparison, such as "color printing", that print attribute is again made effective. For attributes that cannot be supported, such as "copy guard" or "2-hole punching", the management table 210 is searched to examine whether the image forming apparatus 107 includes any alternative print attribute therefor. The transfer condition determining unit 302 references the <AlternativeCode> tag of the image forming apparatus 107, and notifies the UI screen controller 301 of the "watermark printing" attribute as an alternative attribute for the "copy guard" attribute, and the "4-hole punching" attribute as an alternative for the "2-hole punching". The UI screen controller 301 performs pop-up display of these alternative attributes, and prompts the user to determine whether to use the alternative attributes.

FIG. 6 shows an exemplary SOAP message with which each image forming apparatus communicates the supported attributes of the print attribute information to other image forming apparatuses on the same network. The message 600 is generated by the corresponding attribute notification unit 304, and transmitted by multicast via the SOAP controller 307 and the TCP/IP protocol controller 309. The message transmitted by multicast is forwarded to the corresponding attribute receiver 305 via the TCP/IP protocol controller 309 and the SOAP controller 307 in the image forming apparatus as the receiving party. The corresponding attribute receiver 305 converts the message 600 from SOAP/XML data format to an internal data format, and notifies the corresponding attribute management unit 303 of the message 600. The corresponding attribute notification unit 304 regularly performs multicast communications. In this manner, the information of all image forming apparatuses present on the same network is shared.

The message 600 corresponds to the list of supported print attributes of the management table 200. The message 600 is composed of four sections, that is, a transfer attribute 610 relating to the transfer of a print job, a format attribute 620 relating to the format of print data, a print attribute 630 relating to print processing, and a finishing attribute 640 relating to finishing processing. The notation of detailed attributes will be described based on some examples.

The <Support> tag of 611 indicates that the image forming apparatus supports "print job transfer using SSL". Since the <AlternativeCode> tag thereof is 1001, this print attribute belongs to a group 1001. This indicates that when searching for an image forming apparatus as a transfer destination, it is possible to substitute this print attribute with a print attribute other than <SSLConnection>, whose <AlternativeCode> is 1001.

<SupportPaperSizeA3> (631) and <SupportPaperSizeA4> (632) in <PrintSpec> are assigned the same <AlternativeCode> of 1210. In the case where another image forming apparatus transfers a job to the image forming apparatus that has generated the message 600, if the <AlternativeCode> of <PaperSize> contained in the transferred job is 1210, either A3 size or A4 size can be selected as an alternative attribute.

Print attribute 630 contained in <PrintSpec>, copy-forgery-inhibiting pattern printing 633 and print restriction 634 using copy-forgery-inhibiting patterns have the same <AlternativeCode>; thus, they can be mutually used as alternative attributes.

Similarly, sort by shift 642, sort by 90-degree rotation 643, and sort by staple 644 contained in <FinishingSpec> all have the same <AlternativeCode>; thus, they can be mutually used as alternative attributes.

FIG. 7 illustrates processing executed by the transfer condition determining unit 302 during transfer processing as a flowchart.

In step S701, a print client transfers a print job to an image forming apparatus. The print job is stored in the spooler of the image forming apparatus, and displayed on a UI screen in a print waiting list.

In step S702, a single job selected from the print waiting list is accepted through an operational screen of the image forming apparatus, and an instruction to print by transfer is issued. In step S703, a print attribute 101' as a required function of the job subject to the transfer instruction (transferred job) is compared with the functions of the image forming apparatuses in the management table 200, and image forming apparatus available for transfer is sought. If an alternative image forming apparatus has been found as a result of the search in step S704, the procedure moves to step S706, and if an alternative image forming apparatus has not been found, the procedure moves to step S705. In step S705, some of the print attributes to be applied to the transfer destination are de-selected through the display of the screens 510 and 520. After such deselection, the procedure returns to step S703, and again a search for transfer destination image forming apparatuses is carried out. The operations in steps S703 to S705 are repeated and, in the case where a plurality of transfer target image forming apparatuses is found, one transfer destination image forming apparatus is determined in step S706. Then the procedure moves to step S707, and it is determined whether any of the print attributes de-selected in step S705 is included in the print attributes available in the image forming apparatus selected in step S706. If any, such a print attribute is again made effective (S541/S708). Subsequently, it is determined by searching in the management table 210 whether the transfer destination image forming apparatus includes an alternative print attribute for any of the print attributes (required functions) de-selected in step S707. If any, that alternative print attribute is displayed on the UI screen (S541/S710), and prompts a determination from the user.

As described so far, in the case where no alternative image forming apparatus that can perform printing by transfer is found as a result of a search, in addition to de-selecting part of the attribute information, by presenting to the user the alternative attributes for the attributes that have been de-selected, it is possible to easily designate print processing close to what the user desires.

In the image forming apparatus search screen during transfer setting, "narrowing" of the print job attributes and "alternative attributes presentation display" are performed. In this manner, even in an environment where the ability of the alternative image forming apparatus is limited, it is possible to realize printing by transfer that is as close as possible to what the user expected.

Other Embodiments

Some embodiments of the present invention have been described so far. The present invention may be applied to a system composed of a plurality of devices, or may be applied to an apparatus formed from a single device.

The image forming apparatus of the above-described embodiments is not limited to a printer. The present invention can be applied to any device having a function for forming images. For example, such devices include multi-functional peripherals (MFP), copiers or the like. In addition, with an apparatus that does not include a print function, similar processing may be executed when a job other than a print job is input. For example, the present invention can be applied to the case where when a transmission job for executing transmission to another apparatus is input into an apparatus, but that transmission job cannot be executed in the apparatus due to some problem, the transmission job is transferred to another apparatus for execution.

It should be noted that the present invention can be achieved by supplying a program for realizing the functions of the above-described embodiments to a system or an apparatus directly or remotely, and the system or the apparatus reading out and executing the supplied program code. Therefore, a program code itself that is installed on a computer in order to realize the functional processing of the present invention on the computer is also included in the scope of the present invention.

In that case, any mode of program, such as an object code, a program executed by an interpreter, or script data supplied to an OS (operating system), is acceptable, as long as the functionality of the program is provided.

Also, one method of supplying the program is a method of connecting to a website on the Internet using the browser of a client computer, and downloading the computer program of the present invention itself or a file that includes an auto-install function from the website to a recording medium such as a hard disk. The functional processing of the present invention can also be realized by splitting the program code constituting the program of the present invention into a plurality of files and downloading the respective files from different websites. In other words, the claims of the present invention also encompass a WWW server that allows a plurality of users to download a program for realizing the functional processing of the present invention with the use of a computer.

Also, an OS or the like that is running on a computer can perform part or all of the actual processing based on instructions in the program, thereby realizing the functionality of the above-described embodiments.

The present invention can improve user operability when transferring a job from an image forming apparatus to another image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-127375 filed on May 14, 2008, which is hereby incorporated by reference herein in its entirety.

What is claimed is:

1. An image forming apparatus that is connectable to and is capable of transferring a job to a plurality of other image forming apparatuses, comprising:
   a receiving unit configured to receive a job for which functions have been set;
   a display unit configured to display the functions which have been set for the job received by the receiving unit;
   a retrieving unit configured to, if a part of the functions displayed on the display unit is cancelled from the job by a user, retrieve as a transfer destination candidate of the job, from among the plurality of other image forming apparatuses, an image forming apparatus that supports a remaining part of the functions which is not cancelled from the job;
   an alternative function presenting unit configured to present an alternative function for the cancelled part of the functions, the alternative function being included in the image forming apparatus retrieved by the retrieving unit; and
   a generation unit configured to generate, based on the remaining part of the functions and the alternative function, a job to be transferred to the image forming apparatus retrieved by the retrieving unit.

2. The image forming apparatus according to claim 1, wherein the job contains a function related to a data transmission system, an authentication method, or other communication-related information.

3. The image forming apparatus according to claim 1, wherein the job contains a function related to a data format.

4. The image forming apparatus according to claim 1, wherein the job contains a function relating to finishing.

5. The image forming apparatus according to claim 1, further comprising a cancellation unit configured to cancel the part of the functions displayed on the display unit in accordance with an instruction from the user.

6. The image forming apparatus according to claim 1, further comprising a transfer unit configured to transfer the job generated by the generation unit to the image forming apparatus retrieved by the retrieving unit.

7. The image forming apparatus according to claim 1, wherein, the retrieving unit is configured to, if there is no image forming apparatus that supports the functions set for the job received by the receiving unit and a part of the functions displayed on the display unit is cancelled by the user from the job, retrieve an image forming apparatus that supports the remaining part of the functions.

8. A method for controlling an image forming apparatus that is connectable to and is capable of transferring a job to a plurality of other image forming apparatuses, the method comprising:
   receiving a job for which functions have been set;
   displaying the functions which have been set for the received job on a display unit;
   if a part of the functions displayed on the display unit is cancelled from the job by a user, retrieving as a transfer destination candidate of the job, from among the plurality of other image forming apparatuses, an image forming apparatus that supports a remaining part of the functions which is not cancelled from the job;
   presenting an alternative function for the cancelled part of the functions, the alternative function being included in the retrieved image forming apparatus; and
   generating, based on the remaining part of the functions and the alternative function, a job to be transferred to the image forming apparatus retrieved by the retrieving step.

9. A non-transitory computer-readable storage medium storing a computer program for causing a computer to execute a method for controlling an image forming apparatus that is connectable to and is capable of transferring a job to a plurality of other image forming apparatuses, the method comprising:
   receiving a job for which functions have been set;
   displaying the functions which have been set for the received job on a display unit;
   if a part of the functions displayed on the display unit is cancelled from the job by a user, retrieving as a transfer destination candidate of the job, from among the plurality of other image forming apparatuses, an image forming apparatus that supports a remaining part of the functions which is not cancelled from the job;
   presenting an alternative function for the cancelled part of the functions, the alternative function being included in the retrieved image forming apparatus; and
   generating, based on the remaining part of the functions and the alternative function, a job to be transferred to the image forming apparatus retrieved by the retrieving step.

* * * * *